(12) United States Patent
Kassouf et al.

(10) Patent No.: US 8,401,236 B2
(45) Date of Patent: *Mar. 19, 2013

(54) METHOD AND APPARATUS FOR WHEEL ALIGNMENT

(75) Inventors: Thomas L. Kassouf, Port Washington, WI (US); Stephen L. Glickman, Los Gatos, CA (US); David A. Jackson, Point Roberts, WA (US)

(73) Assignee: Snap-On Incorporated, Kenosha, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 13/418,091

(22) Filed: Mar. 12, 2012

(65) Prior Publication Data

US 2012/0170811 A1 Jul. 5, 2012

Related U.S. Application Data

(63) Continuation of application No. 13/083,964, filed on Apr. 11, 2011, now abandoned, which is a continuation of application No. 11/802,245, filed on May 21, 2007, now Pat. No. 7,953,247.

(51) Int. Cl.
*G06K 9/00* (2006.01)

(52) U.S. Cl. ........................ 382/104; 382/154

(58) Field of Classification Search .................. 382/100, 382/103, 104, 154; 356/139.09, 155; 33/203, 33/18, 203.19, 203.2, 288
See application file for complete search history.

(56) References Cited

U.S. PATENT DOCUMENTS

| | | | |
|---|---|---|---|
| 2,552,116 A | 5/1951 | Rodeghiero | 88/14 |
| 3,152,034 A | 10/1964 | Tompkins et al. | 161/113 |
| 3,285,803 A | 11/1966 | Baldwin et al. | 161/205 |
| 3,409,991 A | 11/1968 | Davis et al. | 33/203.14 |
| 3,426,991 A | 2/1969 | Rishovd | 248/205 |
| 3,805,399 A | 4/1974 | Price | 33/356 |
| 3,861,807 A | 1/1975 | Lescrenier | 356/152 |
| 3,871,360 A | 3/1975 | Van Horn et al. | 128/2.05 R |
| 3,952,201 A | 4/1976 | Hounsfield | 250/403 |
| 4,031,884 A | 6/1977 | Henzel | 128/2.05 R |
| 4,108,296 A | 8/1978 | Hayashi et al. | 194/99 |
| 4,123,892 A | 11/1978 | Asami | 53/54 |
| 4,172,326 A | 10/1979 | Henter | 33/288 |
| 4,262,306 A | 4/1981 | Renner | 358/93 |
| 4,362,176 A | 12/1982 | Watanabe | 133/1 A |
| 4,377,038 A | 3/1983 | Ragan | 33/203.18 |
| 4,394,337 A | 7/1983 | Kummermehr | 264/122 |
| 4,399,175 A | 8/1983 | Kummermehr et al. | 428/76 |
| 4,433,489 A | 2/1984 | Boyce | 33/203.18 |
| 4,460,004 A | 7/1984 | Furuya | 133/8 R |
| 4,463,425 A | 7/1984 | Hirano et al. | 364/417 |

(Continued)

FOREIGN PATENT DOCUMENTS

EP 0 806 629 A1 11/1997
EP 1 422 496 A1 5/2004

(Continued)

OTHER PUBLICATIONS

U.S. Appl. No. 60/721,206, filed Sep. 28, 2005, Stieff et al.

(Continued)

*Primary Examiner* — Andrew W Johns
(74) *Attorney, Agent, or Firm* — McDermott Will & Emery LLP

(57) ABSTRACT

A vehicle wheel alignment method and system is provided. A three-dimensional target is attached to a vehicle wheel known to be in alignment. The three-dimensional target has multiple target elements thereon, each of which has known geometric characteristics and 3D spatial relationship with one another.

13 Claims, 11 Drawing Sheets

U.S. PATENT DOCUMENTS

| | | | | |
|---|---|---|---|---|
| 4,573,275 A | 3/1986 | Bremer | | 33/288 |
| 4,853,771 A | 8/1989 | Witriol et al. | | 358/93 |
| 4,994,965 A | 2/1991 | Crawford et al. | | 364/413.15 |
| 5,048,192 A | 9/1991 | Pascoal | | 33/203.18 |
| 5,080,100 A | 1/1992 | Trotel | | 128/653.1 |
| 5,271,055 A | 12/1993 | Hsieh et al. | | 378/95 |
| 5,279,309 A | 1/1994 | Taylor et al. | | 128/732 |
| 5,295,483 A | 3/1994 | Nowacki et al. | | 128/600.03 |
| 5,301,435 A | 4/1994 | Buckley | | 33/293 |
| 5,315,630 A | 5/1994 | Sturm et al. | | 378/65 |
| 5,389,101 A | 2/1995 | Heilburn et al. | | 606/130 |
| 5,394,875 A | 3/1995 | Lewis et al. | | 128/660.09 |
| 5,446,548 A | 8/1995 | Gerig et al. | | 356/375 |
| 5,535,522 A | 7/1996 | Jackson | | 33/288 |
| 5,538,494 A | 7/1996 | Matsuda | | 600/1 |
| 5,582,182 A | 12/1996 | Hillsman | | 128/716 |
| 5,603,318 A | 2/1997 | Heilburn et al. | | 128/630 |
| 5,622,187 A | 4/1997 | Carol | | 128/897 |
| 5,662,111 A | 9/1997 | Cosman | | 128/653.1 |
| 5,724,128 A | 3/1998 | January | | 356/139.09 |
| 5,724,743 A | 3/1998 | Jackson | | 33/288 |
| 5,727,554 A | 3/1998 | Kalend et al. | | 128/653.1 |
| 5,764,723 A | 6/1998 | Weinberger et al. | | 378/65 |
| 5,771,310 A | 6/1998 | Vannah | | 382/154 |
| 5,784,431 A | 7/1998 | Kalend et al. | | 378/65 |
| 5,805,289 A | 9/1998 | Corby et al. | | 356/376 |
| 5,809,658 A | 9/1998 | Jackson et al. | | 33/288 |
| 5,820,553 A | 10/1998 | Hughes | | 600/426 |
| 5,823,192 A | 10/1998 | Kalend et al. | | 128/845 |
| 5,836,954 A | 11/1998 | Heilbrun et al. | | 606/130 |
| 5,877,100 A | 3/1999 | Smith et al. | | 501/12 |
| 5,886,781 A | 3/1999 | Muller et al. | | 356/139.09 |
| 5,889,550 A | 3/1999 | Reynolds | | 348/139 |
| 5,954,647 A | 9/1999 | Bova et al. | | 600/407 |
| 5,987,761 A | 11/1999 | Ohnesorge | | 33/203.18 |
| 6,064,750 A | 5/2000 | January et al. | | 382/103 |
| 6,128,585 A | 10/2000 | Greer | | 702/104 |
| 6,131,293 A | 10/2000 | Maioli et al. | | 33/203.18 |
| 6,134,792 A | 10/2000 | January | | 33/203.18 |
| 6,138,302 A | 10/2000 | Sashin et al. | | 5/600 |
| 6,144,875 A | 11/2000 | Schweikard et al. | | 600/427 |
| 6,146,390 A | 11/2000 | Heilbrun et al. | | 606/130 |
| 6,148,528 A | 11/2000 | Jackson | | 33/288 |
| 6,148,585 A | 11/2000 | Baker | | 52/737.4 |
| 6,165,181 A | 12/2000 | Heilbrun et al. | | 606/130 |
| 6,183,855 B1 | 2/2001 | Buckley | | 428/317.9 |
| 6,185,445 B1 | 2/2001 | Knuettel | | 600/411 |
| 6,185,446 B1 | 2/2001 | Carlsen, Jr. | | 600/411 |
| 6,198,959 B1 | 3/2001 | Wang | | 600/413 |
| 6,270,836 B1 | 8/2001 | Holman | | 427/126.3 |
| 6,272,368 B1 | 8/2001 | Alexanderscu | | 600/407 |
| 6,282,799 B1 | 9/2001 | Warkotsch | | 33/203.18 |
| 6,296,613 B1 | 10/2001 | Emmenegger et al. | | 600/459 |
| 6,300,974 B1 | 10/2001 | Viala et al. | | 348/61 |
| 6,348,058 B1 | 2/2002 | Melkent et al. | | 606/130 |
| 6,370,455 B1 | 4/2002 | Larson et al. | | 701/33 |
| 6,384,907 B1 | 5/2002 | Gooch | | 356/139.03 |
| 6,412,183 B1 | 7/2002 | Uno | | 33/203.12 |
| 6,434,507 B1 | 8/2002 | Clayton et al. | | 702/152 |
| 6,460,004 B2 | 10/2002 | Greer et al. | | 702/104 |
| 6,478,864 B1 | 11/2002 | Field | | 106/169.17 |
| 6,483,577 B2 | 11/2002 | Stieff | | 356/139.09 |
| 6,501,981 B1 | 12/2002 | Schweikard et al. | | 600/427 |
| 6,526,665 B2 | 3/2003 | Jackson | | 33/203.18 |
| 6,600,555 B2 | 7/2003 | McClenahan | | 356/139.09 |
| 6,611,617 B1 | 8/2003 | Crampton | | 382/154 |
| 6,697,761 B2 | 2/2004 | Akatsuka et al. | | 702/151 |
| 6,724,930 B1 | 4/2004 | Kosaka et al. | | 382/154 |
| 6,770,584 B2 | 8/2004 | Barney et al. | | 501/95.1 |
| 6,894,771 B1 | 5/2005 | Dorrance et al. | | 356/139.09 |
| 6,901,673 B1 | 6/2005 | Cobb et al. | | 33/502 |
| 6,973,202 B2 | 12/2005 | Mostafavi | | 382/103 |
| 6,990,215 B1 | 1/2006 | Brown et al. | | 382/106 |
| 7,144,522 B2 | 12/2006 | Burchill et al. | | 252/62 |
| 7,373,726 B2 | 5/2008 | Jackson et al. | | 33/293 |
| 7,444,752 B2 | 11/2008 | Stieff et al. | | 33/203.18 |
| 7,703,212 B2 | 4/2010 | Stieff et al. | | 33/203.18 |
| 7,810,244 B2 | 10/2010 | Stieff et al. | | 33/203.18 |
| 7,869,026 B2 | 1/2011 | Boyer et al. | | 356/243.1 |
| 7,876,455 B2 | 1/2011 | Kawasaki et al. | | 356/607 |
| 7,877,883 B2 | 2/2011 | Schommer et al. | | 33/203 |
| 7,930,834 B2 | 4/2011 | Stieff et al. | | 33/203.18 |
| 7,953,247 B2 * | 5/2011 | Kassouf et al. | | 382/104 |
| 8,033,028 B2 | 10/2011 | Stieff et al. | | 33/203.18 |
| 2001/0034375 A1 | 10/2001 | Schwertfeger et al. | | 516/98 |
| 2002/0092183 A1 | 7/2002 | Jackson | | 33/203.18 |
| 2002/0164474 A1 | 11/2002 | Buckley | | 428/308.4 |
| 2002/0164476 A1 | 11/2002 | Kahl et al. | | 428/328 |
| 2003/0041981 A1 | 3/2003 | Cramer, III | | 160/232 |
| 2003/0063292 A1 | 4/2003 | Mostafavi | | 356/614 |
| 2003/0090682 A1 | 5/2003 | Gooch et al. | | 356/620 |
| 2003/0187610 A1 | 10/2003 | Dorrance et al. | | 702/151 |
| 2003/0210812 A1 | 11/2003 | Khamene et al. | | 382/128 |
| 2003/0215640 A1 | 11/2003 | Ackerman et al. | | 428/405 |
| 2004/0077738 A1 | 4/2004 | Field et al. | | 521/50 |
| 2004/0150816 A1 | 8/2004 | Wakashiro et al. | | 356/234.1 |
| 2005/0025952 A1 | 2/2005 | Field et al. | | 428/304.4 |
| 2005/0047871 A1 | 3/2005 | Lee et al. | | 405/154.1 |
| 2006/0090356 A1 | 5/2006 | Stieff | | 33/288 |
| 2006/0096109 A1 | 5/2006 | Corghi | | 33/520 |
| 2006/0152711 A1 | 7/2006 | Dale, Jr. et al. | | 356/139.09 |
| 2006/0274302 A1 | 12/2006 | Shylanski et al. | | 356/139.09 |
| 2007/0267498 A1 | 11/2007 | Marsh et al. | | 235/454 |
| 2008/0209744 A1 | 9/2008 | Stieff et al. | | 33/203.18 |
| 2008/0222903 A1 | 9/2008 | Abke | | 33/203.18 |
| 2011/0001821 A1 | 1/2011 | Stieff et al. | | 348/135 |
| 2011/0170089 A1 | 7/2011 | Stieff et al. | | 356/139.09 |
| 2011/0316979 A1 | 12/2011 | Stieff et al. | | 348/46 |

FOREIGN PATENT DOCUMENTS

| | | |
|---|---|---|
| EP | 1 434 169 A2 | 6/2004 |
| JP | 61-277010 A | 12/1986 |
| JP | 2002-90118 A | 3/2002 |
| JP | 2010-216969 A | 9/2010 |
| WO | WO 01/46909 A1 | 6/2001 |
| WO | WO 02/23121 A1 | 3/2002 |
| WO | WO 02/097362 A1 | 12/2002 |
| WO | WO 2007/124010 A2 | 11/2007 |

OTHER PUBLICATIONS

U.S. Appl. No. 60/938,947, filed May 18, 2007, Stieff et al.

"Machine Vision Projects at VTT Automation, Machine Automation", Machine Vision News. vol. 5. 2000. http:/www.automaatioseura.fi/jaostot/mvn/mvn5/vttautomation.html.

International Preliminary Report on Patentability and Written Opinion of the International Searching Authority, issued in corresponding International Patent Application No. PCT/US2007/011978, mailed on Mar. 20, 2008.

Chinese Office Action, and English translation thereof, issued in Chinese Application No. 2007-80053075.4 dated Mar. 28, 2012.

* cited by examiner

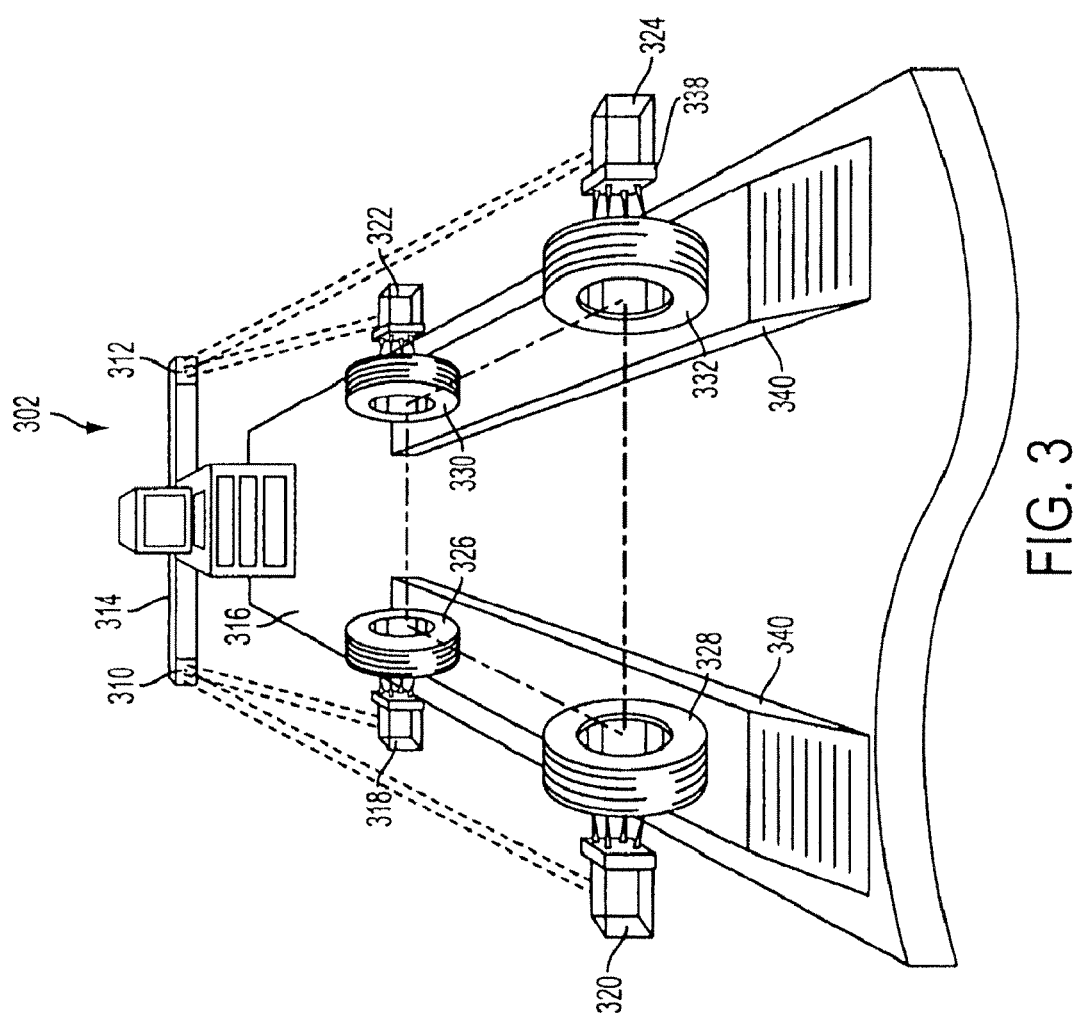

METHOD AND APPARATUS FOR WHEEL ALIGNMENT

RELATED APPLICATIONS

This application is a Continuation of U.S. patent application Ser. No. 13/083,964, filed on Apr. 11, 2011 now abandoned, which is a Continuation of U.S. patent application Ser. No. 11/802,245, filed on May 21, 2007, now U.S. Pat. No. 7,953,247, the entire contents of each of which are hereby incorporated by reference.

BACKGROUND

1. Field of Invention

The teaching presented herein relates to a method and apparatus for determining the alignment of vehicle wheels. More specifically, the teaching relates to a method and apparatus for determining the alignment of vehicle wheels using a three-dimensional target.

2. Discussion of Related Art

It is commonly known that if the wheels of a vehicle are out of alignment with each other, it can result in excessive or uneven wear of the tires and/or adversely affect the handling and stability of the vehicle. Therefore, the wheels of a vehicle need to be periodically checked to determine whether they are in alignment. Conventionally, to determine the alignment of wheels, a two-dimensional target is mounted onto the wheel to facilitate wheel alignment. A conventional two-dimensional target 100 is shown in FIG. 1 (PRIOR ART). The illustrated two-dimensional target 100 is a planar object 105 having a plurality of target elements 120 spatially arranged in a known pattern on the object surface 110. The target elements 120 may be made retro-reflective and the object surface 110 may be non-reflective to provide suitable contrast.

The two-dimensional target 100 can be used to facilitate wheel alignment, which is disclosed in U.S. Pat. Nos. 5,535,522 and 5,809,658. A wheel alignment system (as illustrated in FIG. 9 of U.S. Pat. No. 5,809,658) may be deployed in which a camera may be set up to capture a two-dimensional image of the two-dimensional target 100, in which the target elements 120 on the two-dimensional target 100 are visible. Certain features relating to the target elements may be computed by processing the captured two-dimensional image and such features can be used to determine the alignment of the wheel to which the two-dimensional target is attached using techniques well know in the wheel alignment art.

One problem associated with use of a two-dimensional target for wheel alignment is that a two-dimensional target of a large size is needed in order to achieve accurate wheel alignment determination.

SUMMARY

The need to achieve accurate measurement such as wheel alignment determination is addressed by the present teaching. The present teaching provides an improved system using a 3D target.

One aspect of the present teaching relates to a method for determining the alignment of a motor vehicle wheel. A three-dimensional target is attached on the vehicle wheel, where the three-dimensional target has thereon a plurality of target elements that have certain known geometric characteristics and are configured in 3D space in accordance with certain known three-dimensional relationships with each other. A plurality of target element images corresponding to the plurality of target elements are detected from a 2D image of the three-dimensional target acquired by at least one camera. The alignment of the wheel is determined based on a spatial orientation of the three-dimensional target determined based on the target element images and the three-dimensional relationships among the target elements.

According to one embodiment, a three-dimensional target is attached on a vehicle, where the three-dimensional target has thereon a plurality of target elements, that have certain known geometric characteristics and are configured in 3D space in accordance with known three-dimensional relationships with each other. A 2D image of the three-dimensional target is acquired using at least one camera. The 2D image of the three-dimensional target is used to determine wheel alignment based on the three-dimensional target.

A different aspect of the present teaching relates to a system for determining the alignment of a motor vehicle wheel. A three-dimensional target is used for attaching to a vehicle wheel, where the three-dimensional target has thereon a plurality of target elements that have certain known geometric characteristics and are configured in 3D space in accordance with known three-dimensional relationships with each other. A 2D imaging system is deployed for acquiring a 2D image of the three dimensional target. A target element feature detecting system detects, from the 2D image, a plurality of target element images corresponding to the plurality of target elements. A wheel alignment determination system determines the alignment of the vehicle wheel based on a spatial orientation of the three-dimensional target determined in accordance with the detected target element images and the three-dimensional relationships among the target elements.

According to one embodiment of a system for determining the alignment of a motor vehicle wheel, a three-dimensional target is used that is attachable to a wheel to be aligned. The three-dimensional target has thereon a plurality of target elements that have certain known geometric characteristics and are configured in 3D space in accordance with certain known three-dimensional relationships with each other. An imaging system, having at least one camera, is configured capable of acquiring a 2D image of the three dimensional target. A wheel orientation determination system is configured for utilizing the 2D image of the three-dimensional target to determine wheel orientation based on the three-dimensional target.

Another aspect of the present teaching relates to a method for determining a measurement related to an object. In one embodiment, a three-dimensional target is associated with the object. The three-dimensional target has thereon a plurality of target elements that have certain known geometric characteristics and are configured in 3D space in accordance with certain known three-dimensional relationships with each other. A plurality of target element images corresponding to the plurality of target elements are detected from a 2D image of the three-dimensional target acquired by at least one camera. A measurement relating to the object is determined based on a spatial orientation of the three-dimensional target determined based on the target element images and the three-dimensional relationships among the target elements.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 illustrates an exemplary configuration of an orientation determination system according to an embodiment of the present teaching;

DETAILED DESCRIPTION

The present teaching relates to method and system that utilize a three dimensional (3D) target associated with an object to make a measurement related to the object via image processing of a two dimensional (2D) image of the 3D target. In some embodiments, the object corresponds to a vehicle wheel. A 3D target can be mounted on the vehicle wheel that enables accurate wheel alignment. In some embodiments, the object corresponds to a handheld device. A 3D target can be attached to or associated with the device to enable ride height measurement. In some embodiments, the object corresponds to a camera. A 3D target attached or associated with the camera can be used to enable self-calibrating. Details relating to 3D target enabled measurement based on 2D image processing are provided below.

Figure 1:
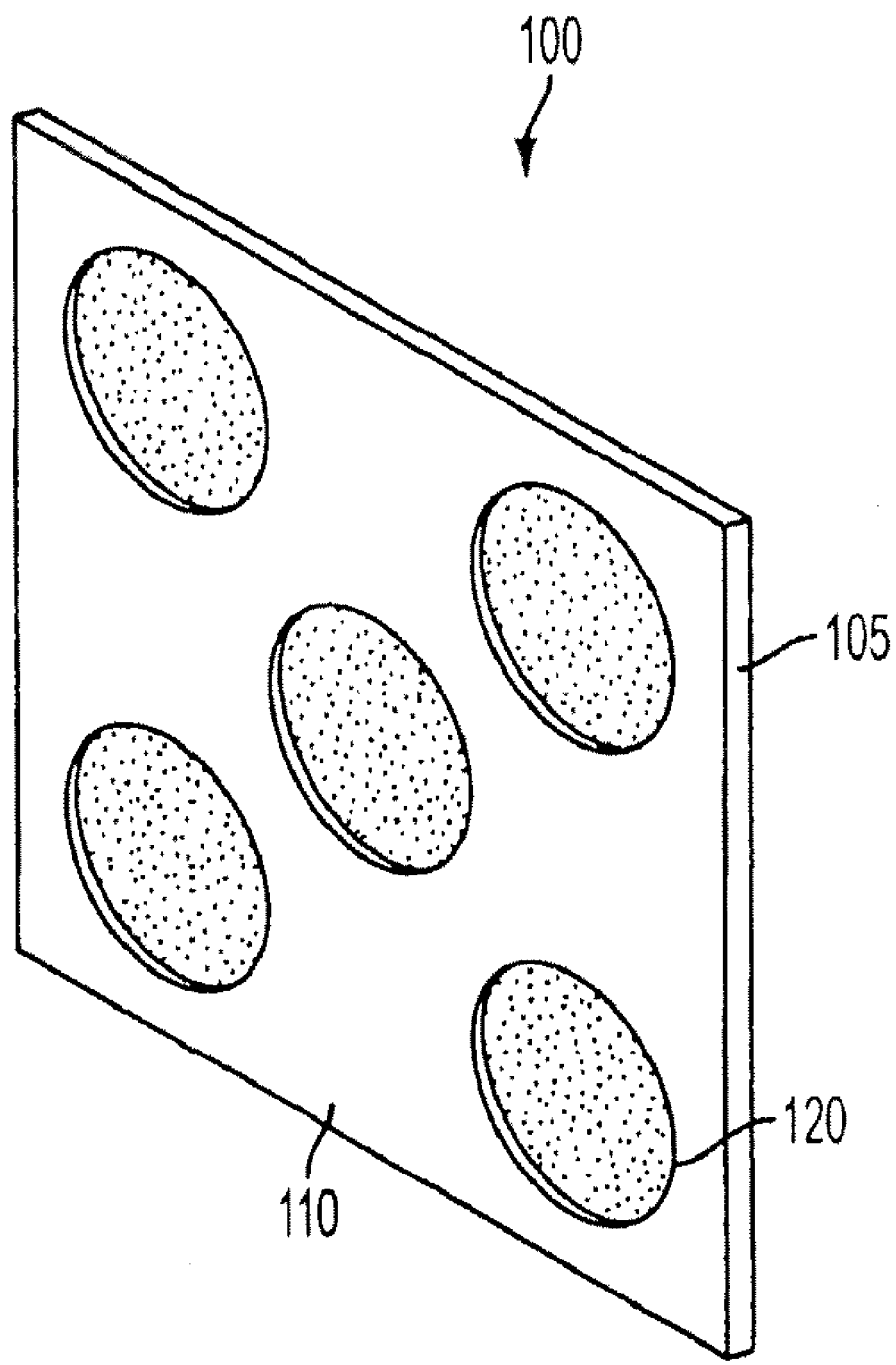
FIG. 1 (PRIOR ART) shows a conventional two-dimensional target used in vehicle wheel alignment.
Figure 2A:
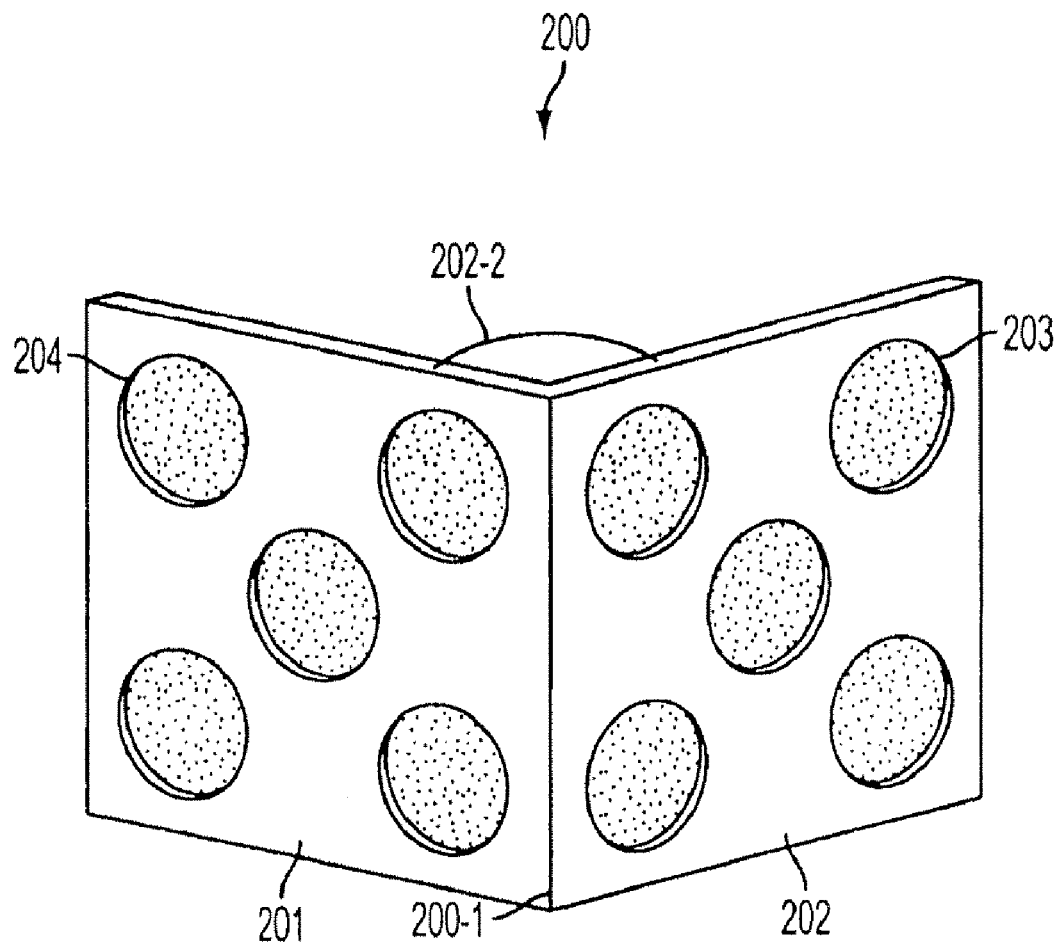
FIGS. 2a-2e show exemplary constructions of three-dimensional targets, according to an embodiment of the present teaching.

FIGS. 2a-2e show exemplary constructions of three-dimensional targets, according to an embodiment of the present teaching. In FIG. 2a, a three-dimensional target 200 comprises two or more solid planes 201 and 202. The two planes 201 and 202 are spatially adjacent to each other by aligning one side of each of the planes (see 200-1) and they form a certain angle 200-2. On plane 201, there are a plurality of target elements 204 that are positioned on plane 201 in accordance with some known spatial pattern. Each target element may possess some characteristics such as a shape, size, or color; and such features can be quantitatively measured. For example, as shown in FIG. 2a, the target elements correspond to solid circles. Such circles are often termed as fiducials or fids. The radius or centroid of each such circle may be measured. In some embodiments, the target elements on the same plane may be uniform. In other embodiments, the target elements on the same plane may not be uniform.

Target elements on each plane are made visually perceptible. This may be achieved by introducing contrast between target elements and the surface of the plane on which they reside. As shown in FIG. 2a, the target elements are made darker than the background surface (the non target element regions) of the plane 201. In some embodiments, the target elements and the background surface may be made of different materials. For instance, the target elements may be made retro-reflective and the background surface may be made non-reflective. In other embodiments, the background surface may be made both lighter than the target elements and non-reflective.

In FIG. 2a, plane 202 also has a plurality of target elements 203. The target elements on plane 202 may be constructed in a manner similar to the target elements on plane 201. For example, target elements in both planes 201 and 202 may possess similar characteristics, as shown in FIG. 2a. In some embodiments, plane 202 may be different from plane 201. The target elements on plane 202 may have different characteristics. In addition, target elements on plane 202 may be arranged differently.

Figure 2B:
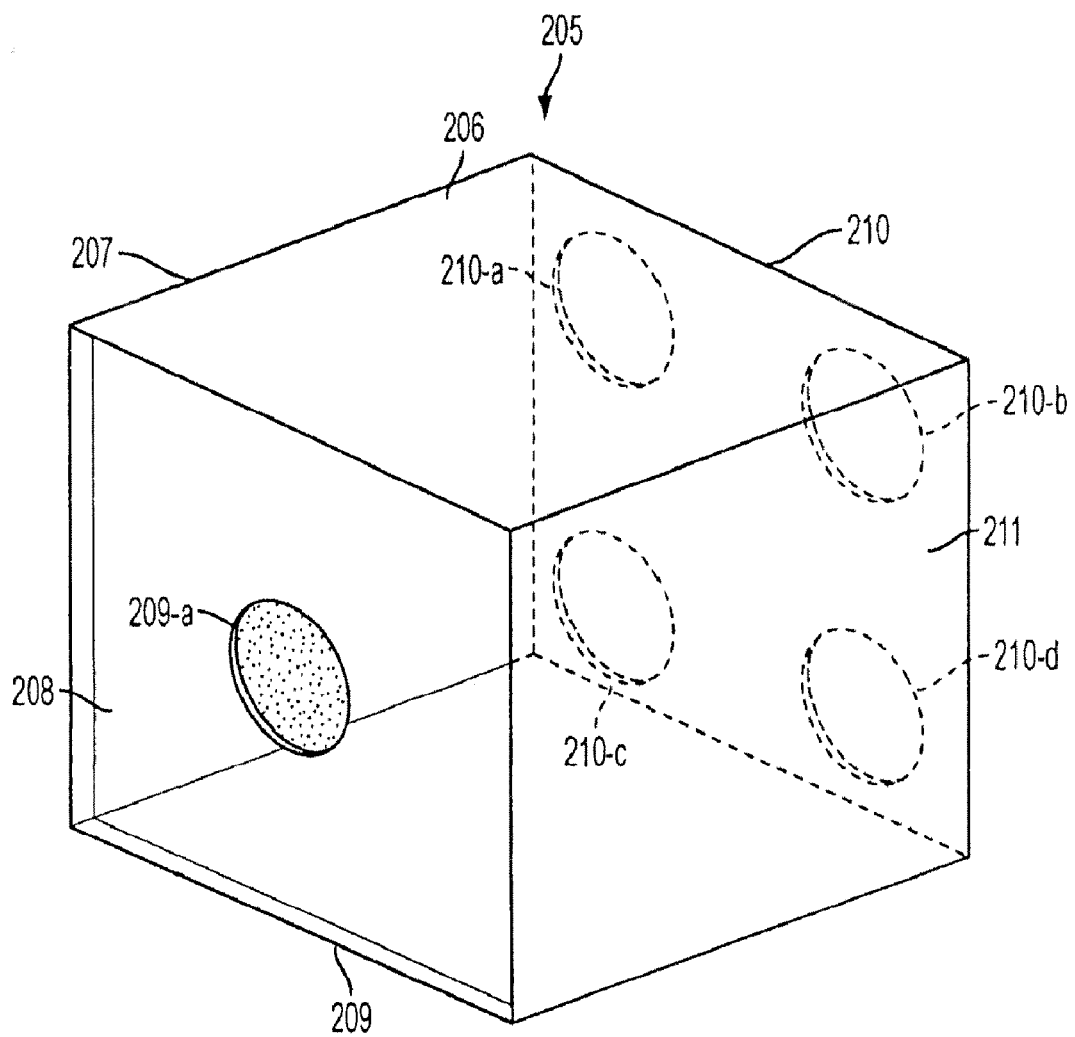

FIG. 2b shows a different three-dimensional target 205, according to one embodiment of the present teaching. Three-dimensional target 205 has an overall shape substantially similar to a rigid cube with a plurality of facets, including top 206, front 207, left 208, bottom 209, back 210, and right 211. In a preferred embodiment, at least two of the facets have one or more target elements thereon. As seen in FIG. 2b, there are four target elements on the back facet, 210-a, 210-b, 210-c, 210-d, and there is one target element 209-a on the front facet of the three-dimensional target 205. In this preferred embodiment, the surface norms of both facets having two-dimensional target elements thereon have the same orientation. In some embodiments, the two-dimensional target elements on both facets are arranged in a pattern so that all the target elements are visible when perceived along certain lines of sight. Although all are visible, these target elements may or may not overlap. To allow all target elements to be visible, one of the two facets may be made transparent, which is illustrated in FIG. 2b where the front facet is transparent when looking in from the front facet towards the back facet.

Figure 2C:
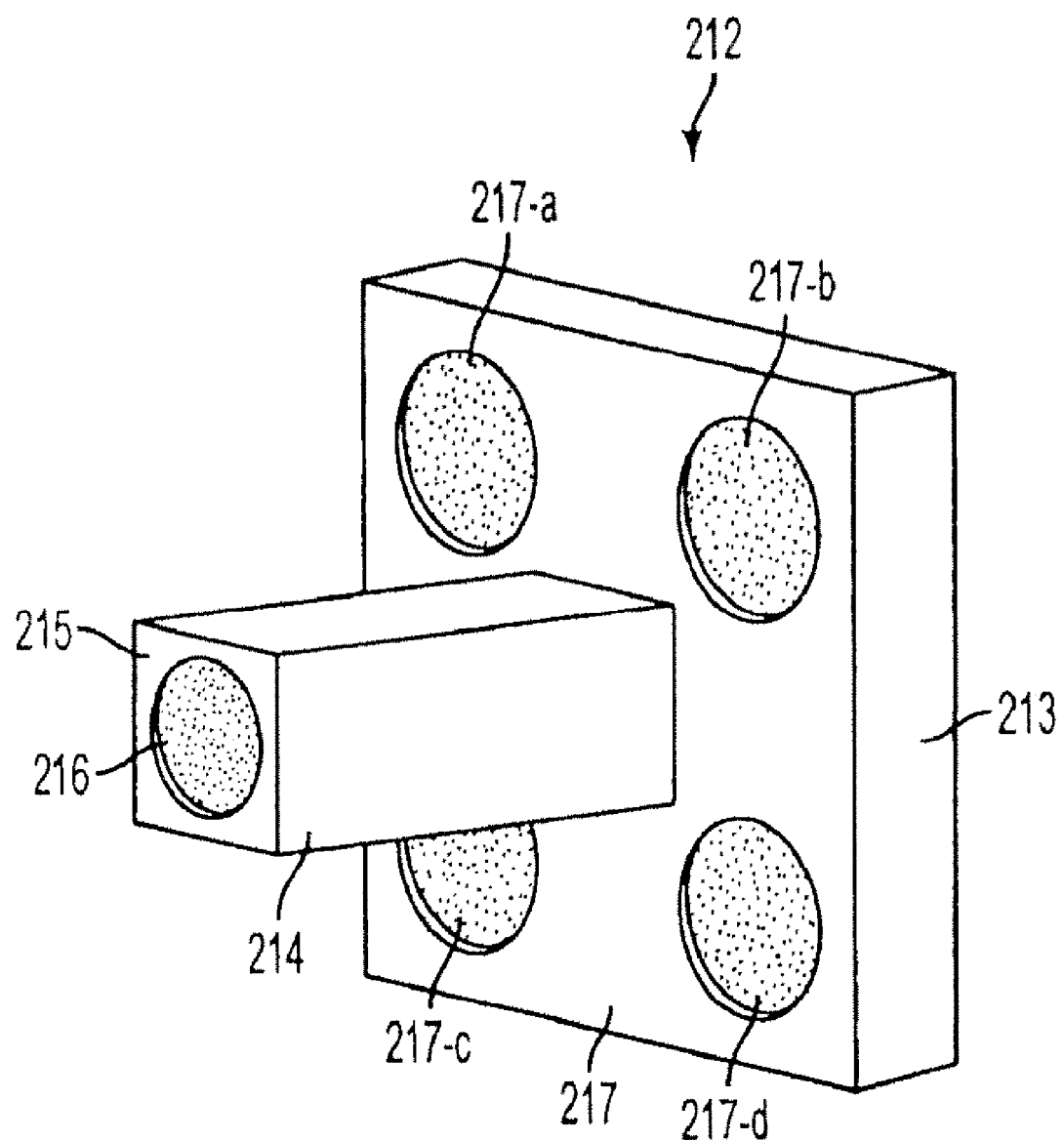

FIG. 2c shows another exemplary construction of a three-dimensional target 212, according to an embodiment of the present teaching. As shown in FIG. 2c, a three-dimensional structure 214 is arranged physically adjacent to a plane 213 and the two form a certain spatial relationship. In some embodiments, the geometric characteristic of the three-dimensional structure 214 is such that it has one surface thereon that has the same spatial orientation same as the spatial orientation of surface 217 of the plane 213 to which the three-dimensional structure 214 is attached. For example, surface 215 in FIG. 2c has the same spatial orientation as surface 217 of the plane 213.

Within such a 3D construction, a plurality of two-dimensional target elements, 216, 217-a, 217-b, 217-c, 217-d, are spatially arranged on both surface 217 and surface 215 according to some pattern. In one preferred embodiment, the two-dimensional target elements are arranged so that all target elements are visible when viewed along a certain line of sight. Although all are visible, these target elements may or may not overlap. In one preferred embodiment, the line of sight is perpendicular to both surface 215 and 217. FIG. 2c illustrates one possible arrangement, where a plurality of target elements are arranged on plane 213 around the three-dimensional structure 214 and a single target element is on surface 215. It should be understood that such illustrations are merely exemplary and they do not limit the scope of the present teaching.

Figure 2D:
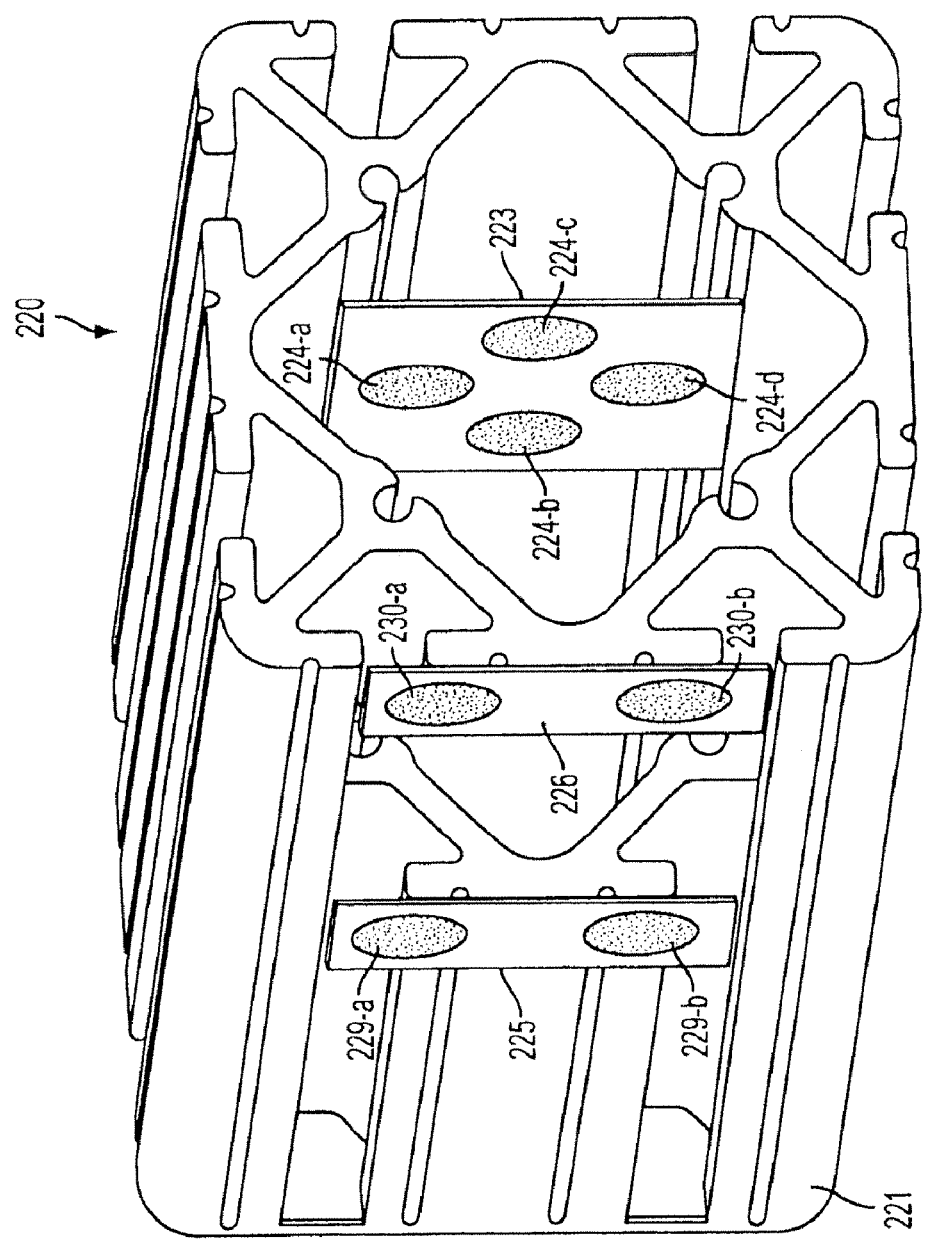

FIG. 2d shows yet another exemplary construction of a three-dimensional target 220, according to one embodiment of the present teaching. The three-dimensional target 220 corresponds to a three-dimensional structure, which has at least two layers of planes in parallel in some hollow space. As shown in FIG. 2d, there are planes 223, 225, and 226, that are parallel to each other and they are positioned at different locations along an axis perpendicular to the surfaces of the planes. One or more of the parallel planes may be on one of the surfaces of the three-dimensional structure 220. For example, parallel planes 225 and 226 are on the front surface 221 of the 3D structure 220.

In some embodiments, each of the planes has one or more target elements arranged thereon according to some pattern. In the illustrated embodiment as shown in FIG. 2d, there are four target elements 223-a, 223-b, 223-c, and 223-d arranged in a diamond shape on plane 223. There are two target elements 229-a and 229-b on plane 225 and two target elements 230-a and 230-b on plane 226. In some embodiments, the pattern in which the target elements are arranged is such that all the target elements are visible when viewed along a certain line of sight. These target elements may or may not overlap.

Figure 2E:
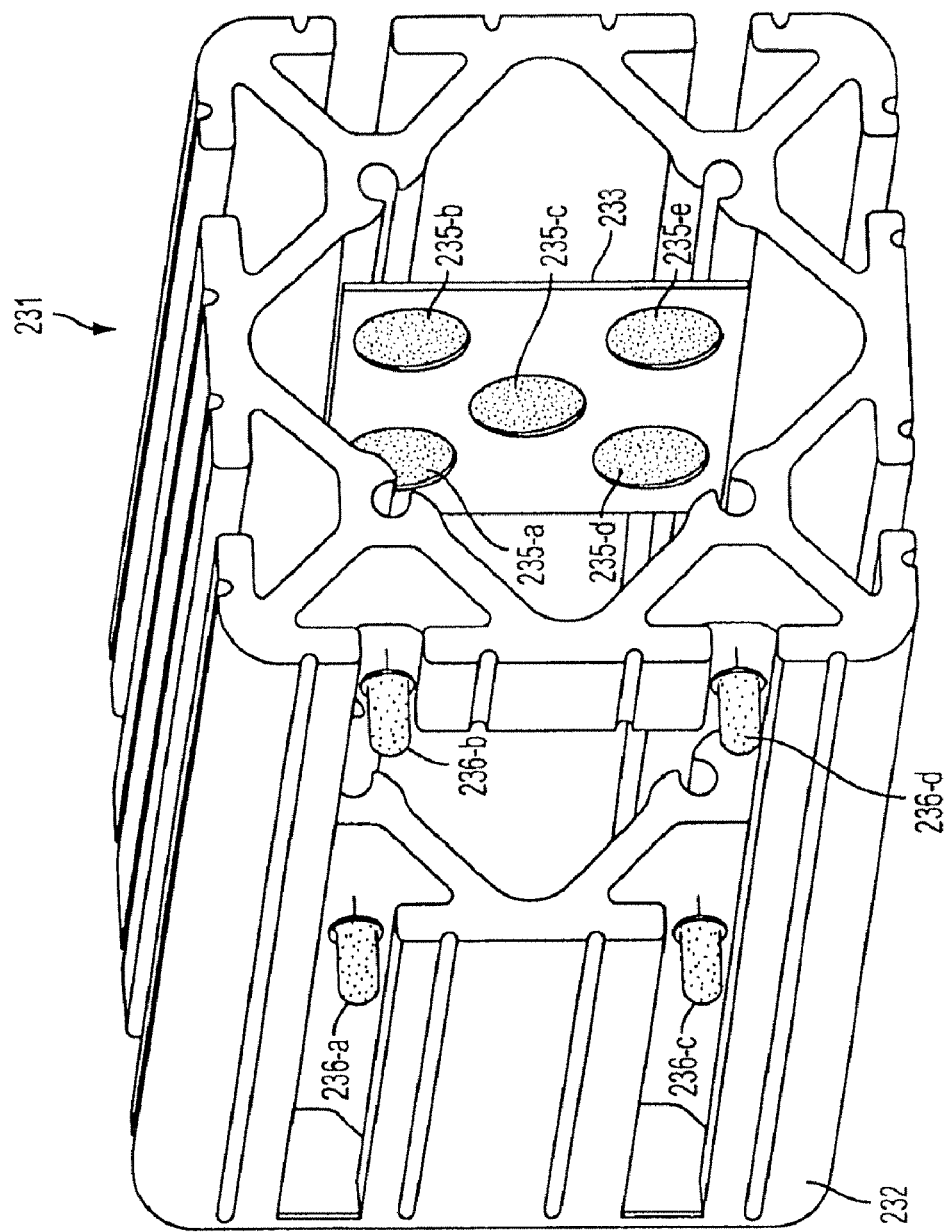

FIG. 2e shows a similar three-dimensional construct 231 as 220 (shown in FIG. 2d) but having different types of target elements on different planes of the structure. For instance, as shown in FIG. 2e, four target elements 236-a, 236-b, 236-c, and 236-d are LEDs that are mounted on the front surface 232 of the three-dimensional structure 231. In addition, FIG. 2e shows a different arrangement of target elements 235-a, 235-b, 235-c, 235-d, 235-e on plane 233.

An example of an orientation determination system on which the present teaching may be implemented is illustrated in FIG. 3. The orientation determination system 300 includes a vision imaging system 302 having a pair of fixed, spaced apart cameras 310, 312 mounted on a beam 314. The beam 314 has a length sufficient to position the cameras 310, 312 respectively outboard of the sides of the vehicle to be imaged by the orientation determination system 300. Also, the beam 314 positions the cameras 310, 312 high enough above the shop floor 316 to ensure that the two target devices 318, 320 on the left side of the vehicle are both within the field of view of the left side camera 110, and two target devices 322, 324 on the right side of the vehicle are both within the field of view of the right side camera 312.

Target devices 318, 320, 322, 324 are mounted on each of the wheels 326, 328, 330, 332 of the motor vehicle, with each target device 318, 320, 322, 324 including an attachment apparatus 338. The attachment apparatus 338 attaches the target device 318, 320, 322, 324 to wheel 326, 328, 330, 332. An example of an attachment apparatus is described in U.S. Pat. No. 5,024,001, entitled "Wheel Alignment Rim Clamp Claw" issued to Borner et al. on Jun. 18, 1991, incorporated herein by reference.

In operation, once the orientation determination system 300 has been calibrated, as described in U.S. Pat. Nos. 5,535,522 and 5,724,743, a vehicle can be driven onto the rack 340, and, if desired, the vehicle lifted to an appropriate repair elevation. The target devices 318, 320, 322, 324, once attached to the wheel rims, are then oriented so that the target devices face the respective camera 310, 312.

The location of the target devices 318, 320, 322, 324 relative to the rim of the wheels 326, 328, 330, 332 to which the target devices are attached are typically known. Once the target devices 318, 320, 322, 324 have been imaged in one position, the wheels 326, 328, 330, 332 are rolled to another position and a new image can be taken. Using the imaged location of the target devices 318, 320, 322, 324 in the two positions, the actual position and orientation of the wheels 326, 328, 330, 332 and wheel axis can be calculated by the vision imaging system 302. Although the distance between the two positions varies, the distance is often approximately 8 inches both forward and back.

Figure 4:
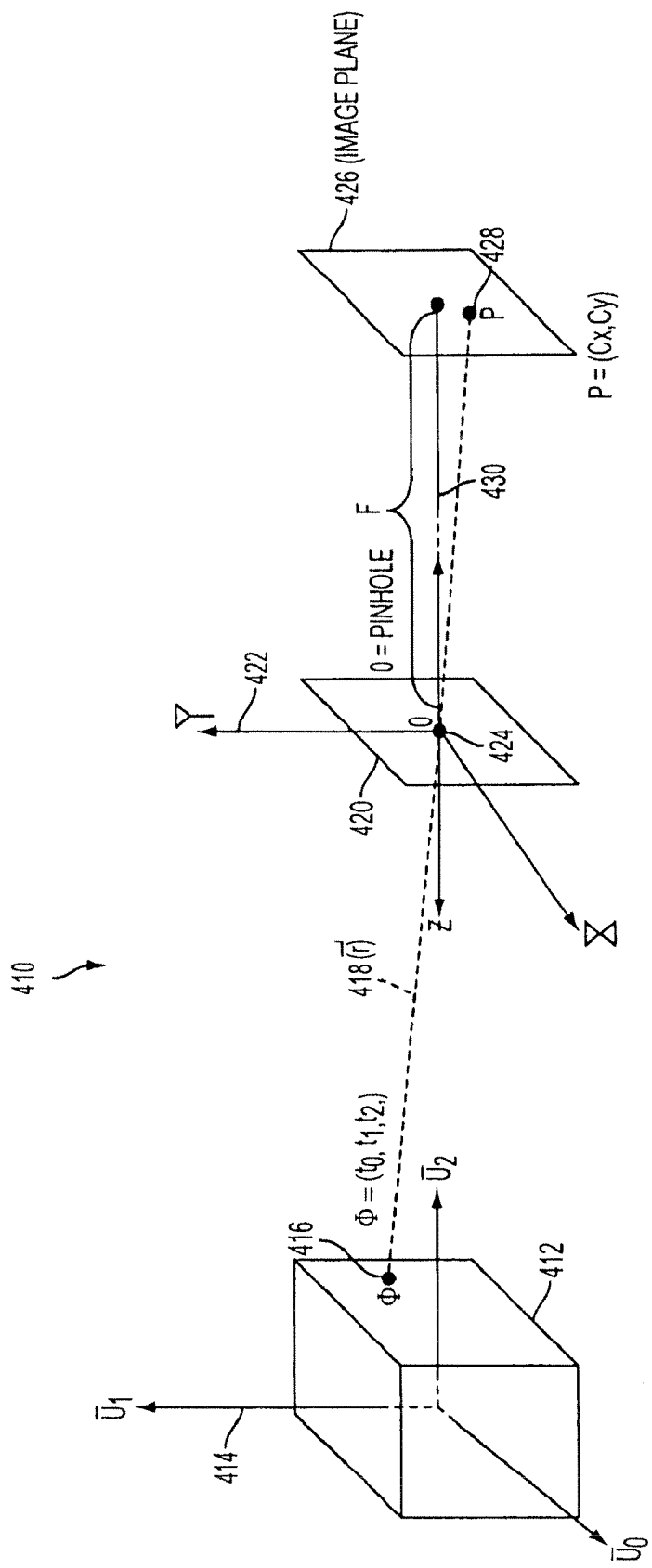
FIG. 4 depicts the geometry of a wheel alignment system using a three-dimensional target, according to an embodiment of the present teaching.

FIG. 4 describes the imaging geometry 410 of a wheel alignment system employing a three-dimensional target 412 based on a pinhole camera model. There are three coordinate systems: a 3D camera coordinate system 422, a 2D image coordinate system 426, and a 3D target coordinate system 414. The 3D camera coordinate system 422 has axes X, Y, and Z, respectively, and has its origin point O (424) as the focal point or pinhole. The 2D image coordinate system 426 is parallel to camera plane 420, formed by the X and Y-axes, and perpendicular to the Z-axis. The distance F from the origin of the 3D camera coordinate system 422 to the origin of the 2D image coordinate system 426 is the focal length of the imaging system 410. The 3D target coordinate system 414 has axes $U_0$, $U_1$, and $U_2$, respectively, defined in relation to the 3D camera coordinate system.

During imaging, each point on the three-dimensional target 412, e.g., point $\Phi$ 416, denoted by $\Phi=(t_0, t_1, t_2)$, where $t_0$, $t_1$, and $t_2$ are the coordinates of the point $\Phi$ in the 3D target coordinate system, i.e. components of the unit vector axes $U_0$, $U_1$, and $U_2$ of the 3D target coordinate system, is mathematically projected along vector r 418 and goes through the pinhole O 424 and arrives at point P on the 2D image plane 426 in the 2D image coordinate system. Such a 2D image point is denoted as $P=(c_X, c_Y)$, where $c_X$ and $c_Y$ are the coordinates of this projected point in the 2D image coordinate system. The relationship between the 3D point $\Phi=(t_0, t_1, t_2)$ on the three-dimensional target (expressed in terms of the 3D target coordinate system) and the 2D image point $P=(C_X, C_Y)$ is expressed as follows:

$$r=C+(t_0 {*} U_0)+(t_1 {*} U_1)+(t_2 {*} U_2)$$

$$c_X=F{*}(r{\cdot}x)/(r{\cdot}z),$$

$$c_Y=F{*}(r{\cdot}y)/(r{\cdot}z),$$

where r is the vector from the origin of the camera coordinate system to a point on the 3D target, $C=(C_X, C_Y, C_Z)$ (not shown) is a vector from the origin of the camera coordinate system to the origin of the target coordinate system, $U_0$, $U_1$, and $U_2$ are the orthogonal unit vector axes of the target coordinate system, defined relative to the camera coordinate system, and x, y, and z are the unit vectors of the camera coordinate system.

Substituting the expression of r, one can obtain the following:

$$r=C+(t_0{*}U_0)+(t_1{*}U_1)+(t_2{*}U_2)$$

$$c_X=F{*}(C_X+(t_0{*}U_0x)+(t_1{*}U_1x)+(t_2{*}U_2x))/c_Z,$$

$$c_Y=F{*}(C_Y+(t_0{*}U_0y)+(t_1{*}U_1y)+(t_2{*}U_2Y))/c_Z,$$

$$c_Z=C_Z+(t_0{*}U_0z)+(t_1{*}U_1z)+(t_2{*}U_{2z})$$

Assume each target element is observed in the acquired 2D image as a blob. Each such blob may be characterized by a centroid, and all the target elements can be denoted by measured centroid coordinates $(mx_i, my_i)$, where i is the index of a set of such centroids. Each such point (i) corresponds to a target element feature point $\Phi$ on the target.

To determine the orientation of a vehicle wheel relative to a camera in an imaging system as just described, from which misalignment of the vehicle wheel may be determined, the imaging system as depicted in FIG. 4 may be calibrated to derive a set of centroids corresponding to observed target elements on a three-dimensional target employed to determine wheel alignment.

Assume that this measured set of centroids $(mx_i, my_i)$ correspond to the projected set of points $(c_{Xi}, c_{Yi})$ from the set of target elements on the three-dimensional target, where i is the index of the set. To determine the orientation of the target relative to the camera, from which misalignment of a vehicle wheel mounted with a three-dimensional target as described herein may be determined, the following cost function can be minimized:

$$\rho = \Sigma_i ((c_{Xi} - mx_i)^2 + (c_{Yi} - my_i)^2)$$

where $(mx_i, my_i)$ represents the measured centroid coordinate of the ith target element of the three-dimensional target mounted on a vehicle wheel, measured in the 2D image acquired during wheel alignment, and coordinate $(c_{Xi}, c_{Yi})$ represents a corresponding point projected from a target element on a hypothetical three-dimensional target.

In some embodiments, the hypothetical three-dimensional target is a 3D target model. This 3D target model has a known structure with a plurality of facets, each having a plurality of target elements. The centroid of each target element on the 3D target model may be mathematically projected or transformed onto a 2D image plane to yield a set of projected or model centroids. Each of such transformed model centroid has a coordinate or $(c_{Xi}, c_{Yi})$. In such a scenario, the model centroids can either be pre-stored or generated on the fly based on a plurality of stored parameters that are relevant to the transformation. Such parameters include camera parameters, the coordinate system for the 3D target model, the camera coordinate system, and the relationship between the camera coordinate system and the 3D target coordinate system.

The cost function p is a function of six independent parameters describing the 3D orientation of the target relative to the camera, because a coordinate $(c_{Xi}, c_{Yi})$ represents a point projected on the camera plane after a 3D point going through a 3D transformation with six degrees of freedom. For example, the six degrees of freedom can be realized via six independent parameters, e.g., $C_X$, $C_Y$, $C_Z$ corresponding to translation in X-Y-Z directions, and yaw, tilt, and roll corresponding to rotations in the three dimensional space.

In minimizing the cost function p, the 3D coordinates of the hypothetical three-dimensional target are mathematically adjusted (via the 6 independent parameters) so that the difference between the two sets of 2D points, $(c_{Xi}, c_{Yi})$ and $(mx_i, my_i)$, are minimized. The adjustment made to the six independent parameters with respect to a calibrated 3D position that yields a minimum p representing the orientation of the target being measured.

Figure 5:
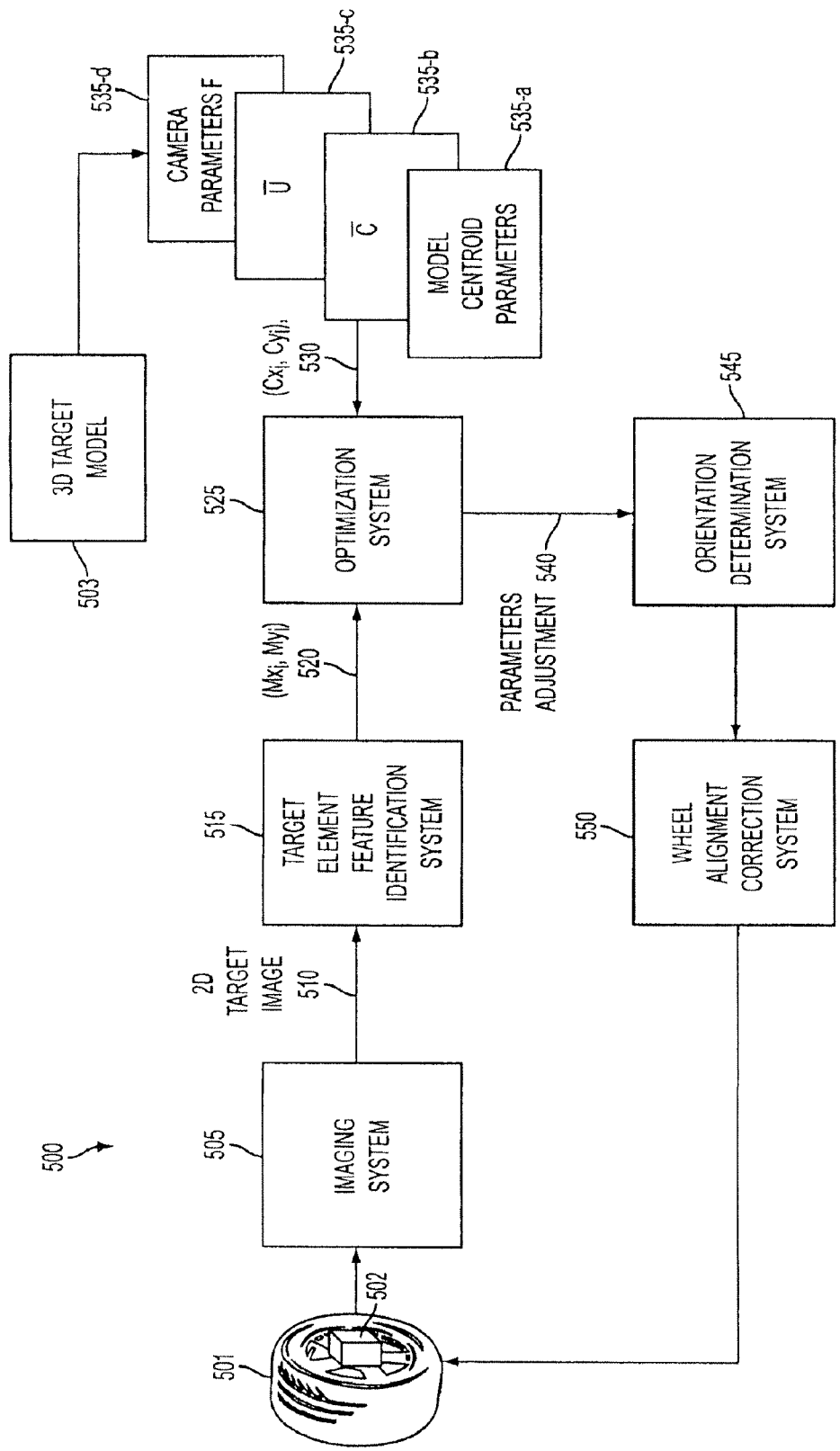
FIG. 5 depicts a high level diagram of an exemplary wheel alignment system using a three-dimensional target, according to an embodiment of the present teaching.

FIG. 5 depicts a high level diagram 500 of an exemplary wheel alignment system using a three-dimensional target, according to an embodiment of the present teaching. The vehicle wheel alignment system comprises a vehicle wheel 501 mounted with a three-dimensional target 502, an imaging system 505, a 3D target model 503, a target element feature identification system 515, an optimization system 525, and an orientation determination system 545. Optionally, a wheel alignment correction system 550 may also be included to correct misalignment if such misalignment is detected.

In operation, the imaging system 505 is set up according to the imaging geometry depicted in FIG. 4. The 3D target model 503 is used to generate model centroid coordinates $(c_{Xi}, c_{Yi})$ 535-a based on a plurality of system parameters such as camera parameters 535-d, the target coordinate system used 535-c, the camera coordinate system used 535-b, and the transformation relationship of the two.

The wheel alignment system 500 may be deployed to perform wheel alignment detection and correction thereof. When the three-dimensional target 502 is mounted on the vehicle wheel 501, e.g., in accordance with the system configuration as illustrated in FIG. 4, the 2D imaging system 505 is activated to acquire a 2D image 510 of the three-dimensional target 502. The target element feature identification system 515 analyzes the acquired 2D image 510 to obtain features such as target blobs, each of which corresponds to one target element, and/or centroids of such identified target blobs or $(mx_i, my_i)$ 520.

The detected 2D image features such as centroids $(mx_i, my_i)$ are sent to the optimization system 525, which minimizes the cost function p by adjusting the 3D position of the hypothetical three-dimensional target or the 3D target model 503 with respect to six independent parameters as described herein. The adjustments made to the six independent parameters are then sent to the orientation determination system 545 where the orientation of the target 501 is determined based on the adjustment needed to minimize the cost function p. Then, the wheel alignment correction system 550 may compute the alignment parameters and any needed correction to the alignment of the wheel based on the measured orientation of the wheels relative to the each other and the vehicle wheel alignment specifications stored in the database.

Figure 6:
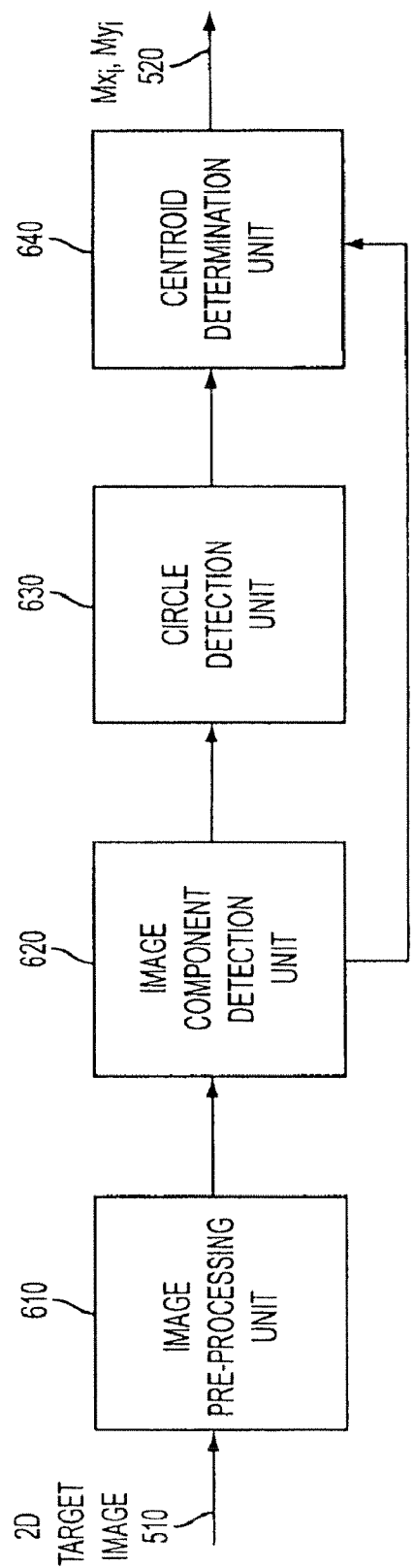
FIG. 6 depicts a high level diagram of an exemplary 2D image feature detection system, according to an embodiment of the present teaching.

FIG. 6 depicts a high level diagram of the target element feature identification system 515, according to an embodiment of the present teaching. In this exemplary embodiment, circle target elements are detected and a centroid for each circle target element is obtained to represent the underlying target element. It should be understood that the 2D image features illustrated herein as well as the method and system employed herein to detect such 2D image features do not limit the scope of the present teaching. Other 2D images features may also be used and the corresponding method and system may be designed and implemented to detect, identify and characterize those 2D image features.

The target element feature identification system 515 comprises an image component detection unit 620, a circle detection unit 630, and a centroid determination unit 640. Optionally, the target element feature identification system 515 may also include an image pre-processing unit 610. A 2D target image 510, acquired by the imaging system 505 may first be pre-processed by the image preprocessing system 610. Such pre-processing may include image filtering, enhancement, or edge detection.

The image component detection unit 620 analyzes a 2D image, either 510 or from the image pre-processing unit 610, to identify meaningful components in the 2D image. Such components may include 2D regions within the 2D image, representing 2D blobs. Each of such blobs may be obtained by, e.g., performing some image segmentation operations. For instance, when the imaged target elements have distinct contrast compared to the background, segmentation may be performed via a threshold operation with respect to the intensity of pixels to obtain individual regions for the target elements or an overlapped version thereof.

In some embodiments, based on the segmented image blobs, further image analysis may be performed to identify desired features. For example, if it is known that target elements are circles, the circle detection unit 630 may be invoked to detect boundaries of each image blob and compare such boundaries to the boundary shapes of such circles projected onto an image plane of an imaging system such as the one herein described. Additional analysis may be applied when there is overlap among image blobs. In some embodiments, algorithms known in the art may be employed to detect the circle boundaries of overlapped image blobs. Such detected circles may be used to derive a certain representation for each circle target element. For instance, the radius of a target element may be computed based on such a detected circle. The projected center of a detected circle may be used as an estimate of the centroid of the circle.

In some embodiments, centroids may be derived directly from image components detected by the image component detection unit 620. For example, for each image blob, algorithms known in the art may be applied to compute a centroid coordinate based on the coordinates of all pixels within the image blob. In some embodiments, the centroid of an image blob may also be derived based on the boundary points of the image blob such as a circle identified by the circle detection unit 630.

Figure 7:
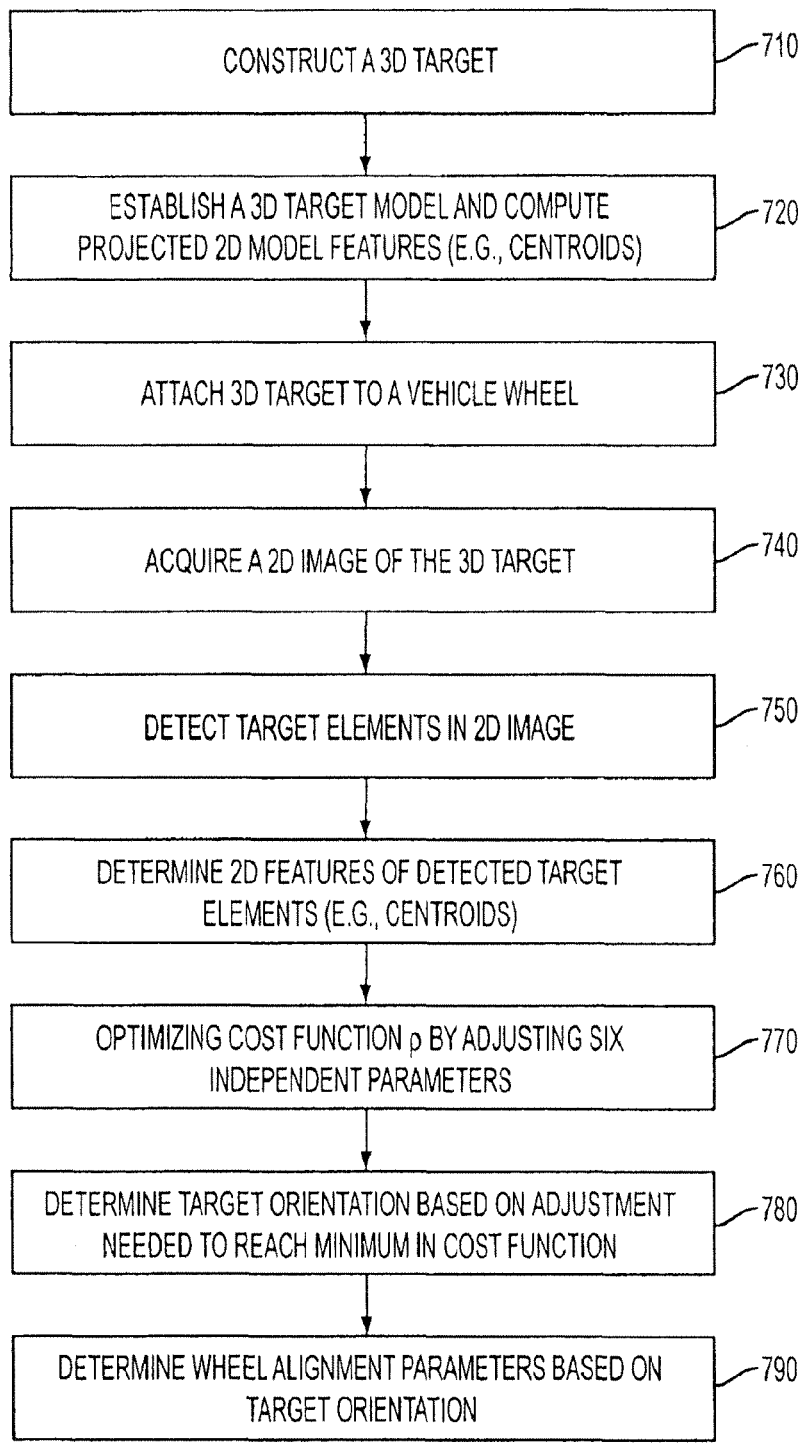
FIG. 7 is a flowchart of an exemplary process for determining wheel alignment using a three-dimensional target, according to an embodiment of the present teaching.

FIG. 7 is a flowchart of an exemplary process for determining wheel alignment using a three-dimensional target, according to an embodiment of the present teaching. At 710, a three-dimensional target is first designed or constructed and such a three-dimensional target may have a structure as illustrated in any of FIGS. 2a-2e. The constructed three-dimensional target can also have any other 3D construct that is appropriate for wheel alignment. At 720, a three-dimensional target model (503 in FIG. 5) for the three-dimensional target is accordingly established and projected 2D features of the three-dimensional target model 503 are computed and stored for the purpose of determining wheel orientation based on the three-dimensional target model.

To perform wheel alignment, the constructed three-dimensional target is mounted, at 730, on a vehicle wheel according to certain geometric constraints as described herein. A calibrated camera in the system as shown in FIG. 4 is activated to capture, at 740, a 2D image of the three-dimensional target. Target elements on the three-dimensional target are identified, at 750, from the 2D image and corresponding features (e.g., centroids) of the target elements are then derived at 760. Such features are used to minimize, at 770, the cost function p by adjusting the six independent parameters with respect to the 2D projected features of the three-dimensional target model 503. The adjustment made during the optimization process is then used, at 780, to compute the orientation of the target. At 790, the computed orientation of the target is then used to determine parameters to be used to align the vehicle wheel.

Below, the process of optimizing p is described according to an embodiment of the present teaching. The cost function p is a non-linear function of six parameters. There is no analytical solution to p. Therefore, its optimization usually requires an iterative process, hence, it is computationally expensive. There is a wealth of literature related to such minimization procedures. For example, the well-known least squares approach can be employed to optimize p. To improve speed in wheel alignment, in some embodiments of the present teaching, a revised optimization process is employed.

In such a revised optimization process, the six independent parameters are separately adjusted. Thus at each step of the optimization, only one of the six parameters is considered a variable, and the other five parameters are treated as constants. In this case, the cost function p is still a non-linear function (a sum of ratios of polynomials) with no analytical solution. In some embodiments, the optimization with respect to one parameter may be carried out iteratively. In this case, each of the six parameters is adjusted, in a separate process, to minimize the cost function p until the changes in p caused by the adjustment is smaller than some threshold.

In some embodiments, the cost function with one parameter may be approximately solved. When the current parameter values are close to the values that minimize the cost function, the cost function p with one parameter is approximately a parabolic function with a differentiable, smoothly varying functional curve. Assume a parabolic or quadratic function in one parameter is expressed as: $\rho(q)=a*q^2+b*q+c$, where q is a parameter (one of the six independent parameters). The first and second derivatives of this function correspond to: $\rho'(q)=2a*q+b$ and $\rho''(q)=2a$. It is known that a minimum of $\rho(q)$ occurs at $q=q^*$ when the first derivative of $\rho(q)$ with respect to q is zero. That is, $\rho'(q)=2a*q+b=0$. Solving this equation, $q^*=-b/(2*a)$. Since $\rho'(q=0)=b$ and $\rho''(q=0)=2a$, therefore, $q^*=-(\rho'(0)/\rho''(0))$. In this way, the parameter value $q^*$ of parameter q minimizes the one parameter cost function $\rho$. Here, $q^*$ corresponds to the adjustment made to parameter q in order to minimize $\rho$. Applying this technique to each parameter in turn, the parameter value for each of the other five independent parameters that minimize the cost function $\rho$ may be obtained.

The above discussed optimization process is applied to mathematical expressions corresponding to a perspective projection process. In some embodiments, a non-perspective solution may also be carried out. As discussed above, $c_z=C_z+(t_0*U_0z)+(t_1*U_1z)+(t_2*U_2z)$. If $Cz>>(t_0*U_0z)+(t_1*U_1z)+(t_2*U_2z)$, then $c_z$ is approximately independent of $U_0z$, $U_1z$, and $U_2z$. This permits an analytical computation of parameters $C$, $U_0$, $U_1$, and $U_2$ instead of applying an iterative process such as a least-square fitting. Such a solution may be adequate as a final solution, or may be used as a starting point for the perspective calculation, giving parameter values close to the minimum, as required.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method for determining the alignment of a motor vehicle wheel, comprising the steps of:
   mounting a three-dimensional target on the vehicle wheel, wherein the three-dimensional target comprises first and second target surfaces non-adjacent each other, each of the first and second target surfaces having a plurality of target elements with geometric characteristics and being configured in 3D space in accordance with three-dimensional relationships with respect to each other;
   acquiring a 2D image of the three-dimensional target using a camera; and
   determining alignment of the wheel using a spatial orientation of the three-dimensional target, derived from the 2D image and the three-dimensional relationships among the target elements.

2. The method of claim 1, wherein the first and second target surfaces are viewable by the camera at the same time.

3. The method of claim 1, wherein the first and second target surfaces are planar.

4. The method of claim 1, wherein the three-dimensional target comprises a target support for supporting the first and second target surfaces relative to each other.

5. A three-dimensional target for attachment to a vehicle wheel, the three-dimensional target comprising:
   first and second target surfaces non-adjacent each other, each of the first and second target surfaces having a plurality of target elements, and configured in 3D space in accordance with three-dimensional relationships with respect to each other; and a clamp for removably attaching the target to the vehicle wheel.

6. The target of claim 5, wherein the first and second target surfaces are simultaneously viewable by a camera.

7. The target of claim 5, wherein the first and second target surfaces are planar.

8. The target of claim 5, comprising a target support attached to the clamp for supporting the first and second target surfaces relative to each other.

9. A three-dimensional target for attachment to a vehicle wheel, the three-dimensional target comprising:
- a clamp for removably mounting the target to the vehicle wheel; and
- a target body attached to the clamp, the target body having first and second target surfaces non-adjacent each other, each of the first and second target surfaces having a plurality of target elements, and configured in 3D space in accordance with three-dimensional relationships with respect to each other.

10. The target of claim 9, wherein the first and second target surfaces are simultaneously viewable by a camera.

11. The target of claim 9, wherein the first and second target surfaces are planar.

12. The target of claim 9, wherein the target body is for supporting the first and second target surfaces relative to each other.

13. A system for determining the alignment of a vehicle wheel, comprising:
- the three-dimensional target of claim 9;
- a 2D imaging system for acquiring a 2D image of the three-dimensional target; and
- a wheel alignment determination system for determining alignment of the wheel using a spatial orientation of the three-dimensional target;
- wherein the spatial orientation of the target is derived from the 2D image and the three-dimensional relationships among the target elements.

* * * * *